United States Patent [19]

Nguyen

[11] Patent Number: 5,790,698
[45] Date of Patent: Aug. 4, 1998

[54] APPARATUS AND METHOD FOR IDENTIFYING A CHARACTER TRANSCRIBED ONTO A SURFACE

[75] Inventor: Thien Kim Nguyen, Les Tuileries, Switzerland

[73] Assignee: Asulab S.A., Bienne, Switzerland

[21] Appl. No.: 839,779

[22] Filed: Apr. 15, 1997

Related U.S. Application Data

[63] Continuation of Ser. No. 509,099, Aug. 1, 1995, abandoned.

[30] Foreign Application Priority Data

Aug. 2, 1994 [CH] Switzerland ............... 02422/94

[51] Int. Cl.$^6$ ........................................... G06K 9/00
[52] U.S. Cl. ........................................... 382/187; 382/188
[58] Field of Search ........................................... 382/187, 188; 33/18.1, 18.2, 32.3

[56] References Cited

U.S. PATENT DOCUMENTS

| | | | |
|---|---|---|---|
| 3,835,453 | 9/1974 | Narayanan | 382/187 |
| 4,047,010 | 9/1977 | Perotto et al. | 382/187 |
| 4,070,649 | 1/1978 | Wright, Jr. et al. | 382/188 |
| 4,477,797 | 10/1984 | Nakagiri | 382/187 |
| 4,953,226 | 8/1990 | Matsuyama | 382/187 |

*Primary Examiner*—Jose L. Couso
*Assistant Examiner*—Anh Hong Do
*Attorney, Agent, or Firm*—Sughrue, Mion, Zinn, Macpeak & Seas, PLLC

[57] ABSTRACT

An identification arrangement for a character transcribed onto a surface has sensors, circuits for periodically detecting the state of the output signals from the sensors, and a change-of-state detector for determining which, among the output signals, is in a high state. Each of the output signals in a high state is compared with the output signal which had been produced by the same sensor during detection of the preceding state. A storage unit stores an identifier corresponding to the sensors for which a change of state has thus been detected, the stored identifiers thus forming a sequence of identifiers corresponding to the transcribed character. The stored sequence of identifiers is compared with at least one sequence of reference identifiers in order to identify the transcribed character.

3 Claims, 6 Drawing Sheets

|  | A | B | C | D | E | F | G | H | I | J | K | L | M | N | O | P | Q | R | S |
|---|---|---|---|---|---|---|---|---|---|---|---|---|---|---|---|---|---|---|---|
| $t_1$ | 0 | 1 | 1 | 0 | 0 | 0 | 0 | 0 | 0 | 0 | 0 | 0 | 0 | 0 | 0 | 0 | 0 | 0 | 0 |
| $t_2$ | 0 | 1 | 1 | 0 | 0 | 1 | 0 | 0 | 0 | 0 | 0 | 0 | 0 | 0 | 0 | 0 | 0 | 0 | 0 |
| $t_3$ | 0 | 1 | 0 | 0 | 0 | 1 | 0 | 0 | 0 | 0 | 0 | 0 | 0 | 0 | 0 | 0 | 0 | 0 | 0 |
| $t_4$ | 0 | 0 | 0 | 0 | 1 | 1 | 0 | 0 | 0 | 1 | 0 | 0 | 0 | 0 | 0 | 0 | 0 | 0 | 0 |
| $t_5$ | 0 | 0 | 0 | 0 | 0 | 0 | 0 | 0 | 1 | 0 | 0 | 0 | 0 | 1 | 0 | 0 | 0 | 0 | 0 |
| $t_6$ | 0 | 0 | 0 | 0 | 0 | 0 | 0 | 0 | 0 | 0 | 0 | 0 | 1 | 1 | 0 | 0 | 1 | 0 | 0 |
| $t_7$ | 0 | 0 | 0 | 0 | 0 | 0 | 0 | 0 | 0 | 0 | 0 | 0 | 1 | 1 | 0 | 0 | 1 | 0 | 0 |
| $t_8$ | 0 | 0 | 0 | 0 | 0 | 0 | 0 | 0 | 0 | 0 | 0 | 0 | 1 | 1 | 0 | 0 | 1 | 0 | 0 |
| $t_9$ | 0 | 0 | 0 | 0 | 0 | 0 | 0 | 0 | 0 | 0 | 0 | 0 | 1 | 1 | 0 | 0 | 1 | 0 | 0 |
| $t_{10}$ | 0 | 0 | 0 | 0 | 0 | 0 | 0 | 0 | 0 | 0 | 0 | 0 | 1 | 1 | 0 | 0 | 1 | 0 | 0 |
| $t_{11}$ | 0 | 0 | 0 | 0 | 0 | 0 | 0 | 0 | 0 | 0 | 0 | 0 | 1 | 1 | 0 | 0 | 1 | 0 | 0 |
| $t_{12}$ | 0 | 0 | 0 | 0 | 0 | 0 | 0 | 0 | 0 | 0 | 0 | 0 | 0 | 1 | 0 | 0 | 1 | 1 | 0 |
| $t_{13}$ | 0 | 0 | 0 | 0 | 0 | 0 | 0 | 0 | 0 | 0 | 0 | 0 | 0 | 1 | 1 | 0 | 0 | 1 | 0 |
| $t_{14}$ | 0 | 0 | 0 | 0 | 0 | 0 | 0 | 0 | 0 | 0 | 0 | 0 | 0 | 0 | 1 | 1 | 0 | 0 | 1 |
| $t_{15}$ | 0 | 0 | 0 | 0 | 0 | 0 | 0 | 0 | 0 | 0 | 0 | 0 | 0 | 0 | 0 | 1 | 0 | 0 | 1 |
| $t_{16}$ | 0 | 0 | 0 | 0 | 0 | 0 | 0 | 0 | 0 | 0 | 0 | 0 | 0 | 0 | 0 | 1 | 0 | 0 | 0 |
| $t_{17}$ | 0 | 0 | 0 | 0 | 0 | 0 | 0 | 0 | 0 | 0 | 0 | 0 | 0 | 0 | 0 | 1 | 0 | 0 | 0 |
| $t_{18}$ | 0 | 0 | 0 | 0 | 0 | 0 | 0 | 0 | 0 | 0 | 1 | 0 | 0 | 0 | 0 | 0 | 0 | 0 | 0 |
| $t_{19}$ | 0 | 0 | 0 | 0 | 0 | 0 | 0 | 0 | 0 | 0 | 1 | 0 | 0 | 0 | 0 | 0 | 0 | 0 | 0 |
| $t_{20}$ | 0 | 0 | 0 | 0 | 0 | 0 | 0 | 0 | 0 | 0 | 1 | 0 | 0 | 0 | 1 | 0 | 0 | 0 | 0 |
| $t_{21}$ | 0 | 0 | 0 | 0 | 0 | 0 | 0 | 0 | 0 | 0 | 0 | 0 | 0 | 0 | 1 | 0 | 0 | 1 | 1 |
| $t_{22}$ | 0 | 0 | 0 | 0 | 0 | 0 | 0 | 0 | 0 | 0 | 0 | 0 | 0 | 0 | 0 | 0 | 0 | 1 | 1 |
| $t_{23}$ | 0 | 0 | 0 | 0 | 0 | 0 | 0 | 0 | 0 | 0 | 0 | 0 | 0 | 0 | 0 | 0 | 0 | 1 | 0 |
| $t_{24}$ | 0 | 0 | 0 | 0 | 0 | 0 | 0 | 0 | 0 | 0 | 0 | 0 | 0 | 0 | 0 | 0 | 0 | 1 | 0 |

| | | | |
|---|---|---|---|
| $t_1$ | B | C | |
| $t_2$ | B | C | F |
| $t_3$ | B | F | |
| $t_4$ | E | F | J |
| $t_5$ | I | N | |
| $t_6$ | M | N | Q |
| $t_7$ | M | N | Q |
| $t_8$ | M | N | Q |
| $t_9$ | M | N | Q |
| $t_{10}$ | M | N | Q |
| $t_{11}$ | M | N | Q |
| $t_{12}$ | N | Q | R |
| $t_{13}$ | N | O | R |
| $t_{14}$ | O | P | S |
| $t_{15}$ | P | S | |
| $t_{16}$ | P | | |
| $t_{17}$ | P | | |
| $t_{18}$ | K | | |
| $t_{19}$ | K | | |
| $t_{20}$ | K | O | |
| $t_{21}$ | O | R | S |
| $t_{22}$ | R | S | |
| $t_{23}$ | R | | |
| $t_{24}$ | R | | |

Fig. 8

| | | | |
|---|---|---|---|
| $t_1$ | B | C | |
| $t_2$ | $ | $ | F |
| $t_3$ | $ | $ | |
| $t_4$ | E | $ | J |
| $t_5$ | I | N | |
| $t_6$ | M | $ | Q |
| $t_7$ | $ | $ | $ |
| $t_8$ | $ | $ | $ |
| $t_9$ | $ | $ | $ |
| $t_{10}$ | $ | $ | $ |
| $t_{11}$ | $ | $ | $ |
| $t_{12}$ | $ | $ | R |
| $t_{13}$ | $ | O | $ |
| $t_{14}$ | $ | P | S |
| $t_{15}$ | $ | $ | |
| $t_{16}$ | $ | | |
| $t_{17}$ | $ | | |
| $t_{18}$ | K | | |
| $t_{19}$ | $ | | |
| $t_{20}$ | $ | O | |
| $t_{21}$ | $ | R | S |
| $t_{22}$ | $ | $ | |
| $t_{23}$ | $ | | |
| $t_{24}$ | $ | | |

APPARATUS AND METHOD FOR IDENTIFYING A CHARACTER TRANSCRIBED ONTO A SURFACE

This is a Continuation of application Ser. No. 08/509,099, filed Aug. 1, 1995, now abandoned.

BACKGROUND OF THE INVENTION

The present invention relates to an arrangement for the identification of a character transcribed by a writing instrument onto a surface, said arrangement comprising a plurality of sensors, each producing an output signal having either a first state or a second state respectively according to the absence or the presence of said writing instrument in a discrete zone of said surface, means for detecting periodically the state of said output signals during the transcription of said character, and means for determining which among said output signals are in said second state at each detection of state.

The present invention also concerns a method of identification of a character transcribed by a writing instrument onto a surface with the help of a plurality of sensors, each producing an output signal having either a first state or a second state, respectively according to the absence or the presence of said writing instrument in a discrete zone of said surface, said method comprising the steps of:

periodically detecting the state of said output signals during transcription of said character, and determining at each detection of the state which among said output signals is in said second state.

Such an arrangement and such a method of identification have already been described in the patent document EP-A-0 165 548. This document describes an electronic watch comprising an arrangement for recognizing characters written by hand on the watch crystal. A matrix of photoelectric sensors is arranged on the inner surface of the crystal. When a user transcribes a character onto the upper surface of the crystal, the intensity of the light detected by the photoelectric sensors is changed and thus permits the detection of the coordinates of the transcribed character.

The written character is then recognized according to the coordinates thus detected. In order to accomplish this, the respective coordinates of the first, second and third strokes of the written character are successively stored into different memory zones. After the time predetermined for inscribing the character has expired, the data representing the character coordinates which have been stored in the three memory zones are respectively compared with the data of reference characters. The reference character for which the data have the greatest similarity to the data of the transcribed character is considered as being this latter.

Although this manner of identification is provided for use in an electronic watch, it will be understood that it imposes a certain number of demands on the watch. On the one hand, the comparison between the data of the transcribed character and that of the reference characters necessitates highly detailed data processing. There results therefrom an additional high load on the cell which energizes the watch, which diminishes its autonomy considerably. On the other hand, a substantial memory capable of storing all the data which correspond to the transcribed character and to the reference characters is necessary in order to effect such comparison. Such a memory and the management of the stored data in the latter imply not only an additional high energy consumption, but also a slowing down of the normal time keeping functions of the time keeping circuit of the watch while such data is processed.

SUMMARY OF THE INVENTION

The present invention has as purpose to provide an arrangement and a method of identification of a character transcribed onto a surface which overcomes at least partially the drawbacks of the prior art.

Another purpose of the present invention is an arrangement and method of identification of a character transcribed onto a surface which are simple and efficient, which exhibit high reliability, which use little energy and which are better suited to utilization in an electronic watch than the arrangements and methods of the prior art.

The invention thus has as object an arrangement for the identification of a character transcribed onto a surface by a writing instrument, such arrangement comprising:

a plurality of sensors, each of them producing an output signal having either a first state or a second state respectively according to the absence or the presence of said writing instrument in a discrete zone of said surface;

means for detecting periodically the state of said output signals during the transcription of said character; and, means for determining which, among said output signals are in said second state at each detection of state;

said arrangement being characterized in that it furthermore comprises:

means for comparing each of said output signals found in said second state with the output signal which had been produced by the same sensor during the preceding detection of state;

means for storing, according to a predetermined order of said sensors, an identifier corresponding to the sensors for which a change of state has thus been detected, said stored identifiers thus forming a sequence of identifiers corresponding to said transcribed character; and means for comparing said sequence of stored identifiers with at least one sequence of reference identifiers in order to identify said transcribed character.

The invention has also as object a method of identification of a character transcribed by a writing instrument on a surface, with the help of a plurality of sensors, each of them producing an output signal having either a first state or a second state respectively according to the absence or the presence of said writing instrument in a discrete zone of said surface, said method comprising the steps of:

periodically detecting the state of said output signals during the transcription of said character; and determining at each detection of state which, among the output signals, is in said second state; said method being characterized in that it furthermore comprises the steps of:

comparing each of said output signals found in said second state with the output signal produced by the same sensor at the detection of the preceding state;

storing, according to a predetermined order of said sensors, an identifier corresponding to the sensors for which a change of state has thus been determined, said stored identifiers thus forming a sequence of identifiers corresponding to said transcribed character; and comparing said sequence of stored identifiers with at least one sequence of reference identifiers in order to identify said transcribed character.

Thanks to these characteristics, a simplification is effected of the data corresponding to the transcribed character and the data corresponding to the reference characters, which must initially be stored and thereafter processed in order to identify the transcribed character. Consequently, there is obtained an arrangement and a method of identification which represent an improvement relative to the present day arrangements and methods.

Other characteristics and advantages of the invention will appear in the course of the description to follow, given solely by way of example and prepared having reference to the attached drawings.

DESCRIPTION OF PREFERRED EMBODIMENTS

Figure 1:
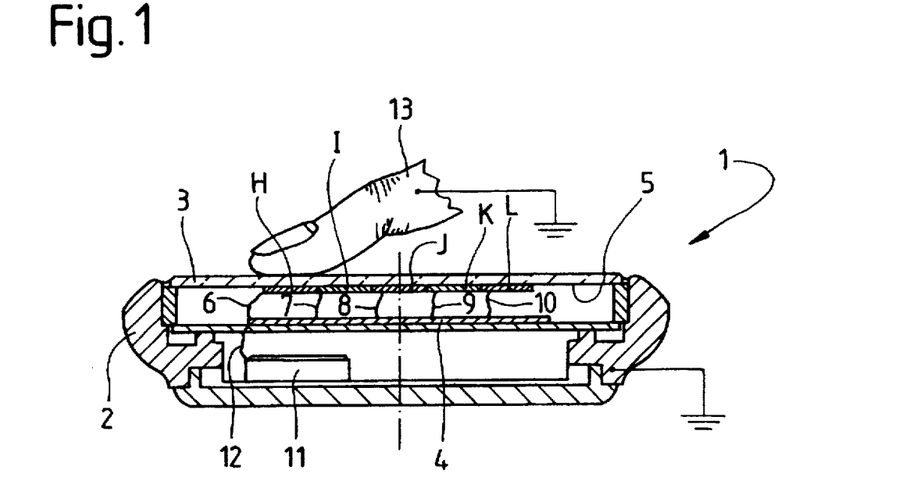
FIG. 1 is a cross-section view of a watch including an identification arrangement according to the present invention.

FIG. 1 shows a cross-section of a watch 1 including a case 2 and a crystal 3. An electronic circuit 4 is arranged in case 2. Conductive electrodes, preferably transparent, are arranged on the inner face 5 of crystal 3, only five of these electrodes referenced respectively H, I, J, K and L having been shown on FIG. 1. The electrodes H to L are respectively coupled to the electronic circuit 4 by conductors 6, 7, 8, 9 and 10. A battery 11 or another electrical energy source is also arranged in case 2 and is coupled to the positive pole of the electronic circuit 4 by a conductor 12.

Each of electrodes H to L forms one of the armatures of a series of capacitive sensors, the other armature of each of such capacitive sensors being formed by the finger 13 of the wearer of watch 1 when it touches the outer face of the crystal 3 facing a specific electrode. Finger 13 of the wearer is coupled to the ground of the electronic circuit 4 through the case 2 which is in contact with the wrist of the wearer and which is respectively coupled to the negative poles of the electronic circuit 4 and the battery 11.

It will be noted to this end that a stray capacity is, through the construction, present between each of the electrodes H to L and case 2 of watch 1. Each of the capacitive sensors, in which electrodes H to L form a part, and the stray capacitor associated with such capacitive sensor are coupled in parallel between ground and an input of the electronic circuit 4.

The electronic circuit 4 comprises a series of voltage controlled oscillators, the frequency of each of such oscillators varying as a function of the total capacity present between its input and ground. If the finger 13 of the wearer of watch 1 is not placed on the crystal 3 facing a specific electrode, one of the armatures of the capacitive sensor corresponding thereto is consequently not formed. In such case, the total capacity present between the input and the ground of the oscillator is equivalent to the capacity of the stray capacitor. On the other hand, when finger 13 is placed on crystal 3 facing such electrode, the two armatures of the corresponding capacitive sensor are formed. The total capacity between the input and ground of the oscillator is now equivalent to the sum of the capacity of the capacitive sensor and the capacity of the stray capacitor.

Thus, the oscillation frequency of each of the voltage controlled oscillators varies as a function of the presence or the absence of finger 13 on the portion of crystal 3 which faces the electrode associated with such oscillator.

Figure 2:
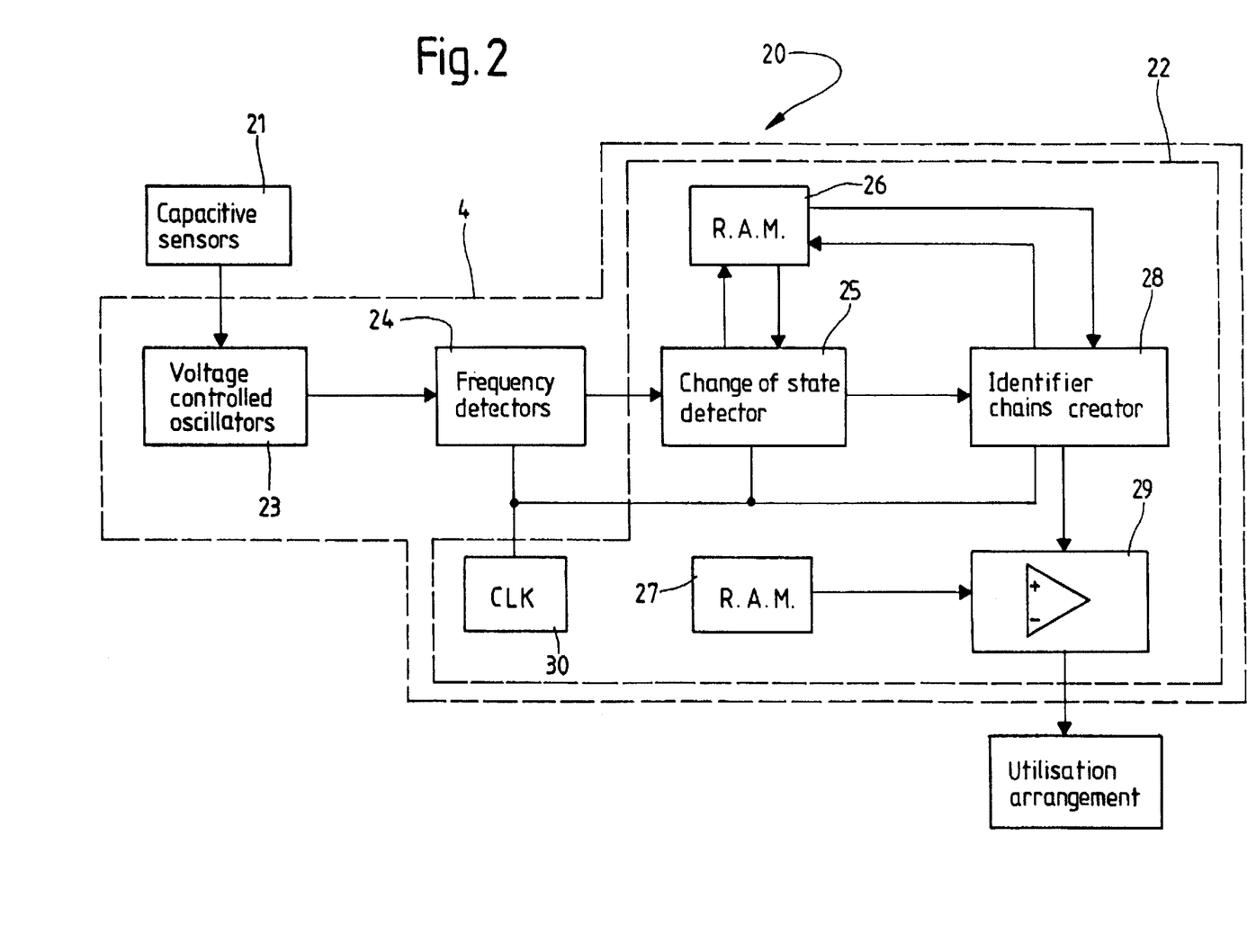
FIG. 2 is a schematic of the identification arrangement of FIG. 1.

FIG. 2 shows an identification arrangement 20 of a character transcribed onto crystal 3 of watch 1. The identification arrangement 20 comprises a sequence of capacitive sensors 21 comprising electrodes H to L of FIG. 1 and the electronic circuit 4. The electronic circuit 4 comprises a control circuit 22, a sequence of voltage controlled oscillators 23 and a sequence of frequency detectors 24.

The control circuit 22 comprises a change-of-state detector 25, read-write memory units (RAM) 26 and 27, a creator of identifier sequences 28, a comparator of identifier sequences 29 and a clock circuit 30. The functioning of the frequency detectors, the change-of-state detector 25 and the creator of identification sequences 28 is, for all, controlled at a predetermined cadence by the frequency of the clock pulses coming from the clock circuit 30. The control circuit 22 can be formed by using any microprocessor whatsoever. The programming of such a micro-processor, in order to obtain this circuit from the description hereinbelow, is well known to persons skilled in the art and consequently it will not be described in detail.

Figure 3:
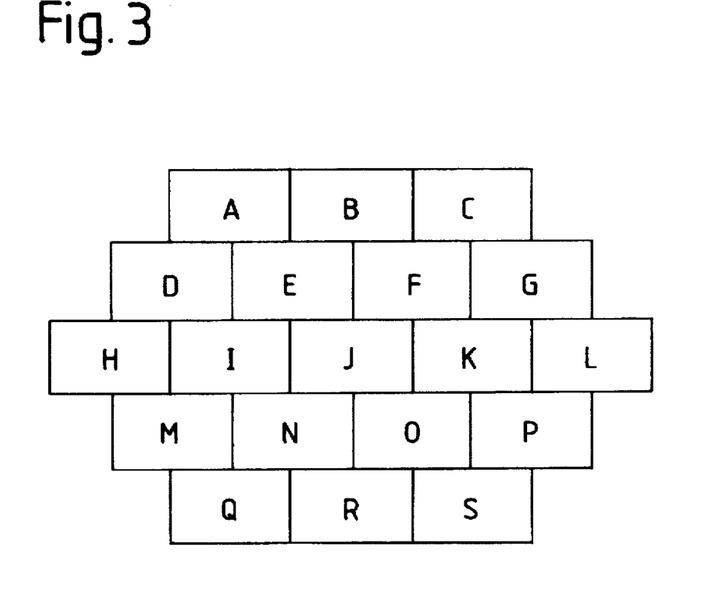
FIG. 3 is a schematic of the spatial arrangement of the capacitive sensors of the identification arrangement of FIG. 2.

The sequence of capacitive sensors 21 includes electrodes referenced A to S arranged on the lower surface 5 of crystal 3 according to a spatial arrangement shown on FIG. 3. When the wearer of watch 1 places his finger for example on crystal 3 facing the electrode C, a capacitive sensor corresponding thereto is formed and consequently the total capacity present at the input of the voltage controlled oscillator associated with this capacitive sensor is modified. There results therefrom that the frequency of the output signal of such voltage controlled oscillator is likewise modified, such frequency change being detected by the frequency detector associated with this voltage controlled oscillator.

Furthermore, each frequency detector compares the frequency of the output signal of the voltage controlled oscillator with which it is associated with a predetermined reference value. This reference value is defined in a manner such that the detection of a frequency lower than such value corresponds to the absence of a finger on crystal 3 facing a specific electrode, while the detection of a frequency greater than this value corresponds to the presence of a finger on crystal 3 facing such electrode. Thus, the output signal from each frequency detector exhibits a high state or a low state according to whether or not a finger is placed on crystal 3 of watch 1 facing the corresponding electrode.

There results therefrom that the output signals from the sequence of frequency detectors 24 form a binary word in which the binary elements are representative of the states of such output signals. Each frequency detector samples the output signal of the voltage controlled oscillator with which it is coupled at a cadence governed by the clock circuit 24.

Thus, a new binary word for which each binary element represents the presence or the absence of the finger of a wearer of the watch 1 on crystal 3 facing one of the electrodes A to S is likewise generated at this cadence.

The change-of-state detector 25 is coupled to the sequence of frequency detectors 24 in a manner such that it receives the binary words which come from the sequence of frequency detectors 24. The change-of-state detector 25 temporarily stores each binary word which it receives in the RAM memory 26. In the present example, when a binary word is received at its input, the change-of-state detector 25 determines initially which of the binary elements forming such word are in the high state, thus indicating the presence of a finger on crystal 3 of watch 1 facing the corresponding electrode.

Next, the detector 25 compares each of such binary elements found in the high state with the corresponding binary elements of the preceding word stored in the RAM memory 26. In case of a difference of state between such binary elements, that is to say for the case in which a binary element is in the high state while the corresponding binary element of the preceding word is in the low state, detector 25 furnishes a signal to the creator of sequences of identifiers 28 which identifies the capacitive sensor corresponding to such binary element. This signal can be, for example, an address identifying one of the electrodes A to S which corresponds to such capacitive sensor.

Consequently, the creator of sequences of identifiers 28 periodically receives, during the inscription of a character written on crystal 3 and at a cadence determined by the frequency of the pulses coming from clock circuit 30, a group of signals indicating which are the capacitive sensors which are "activated" by finger 13 at each pulse of the clock circuit 30. The indicators forming each group are stored one after another by the creator of sequences of identifiers 28 in RAM 26 according to an order corresponding to a predetermined order of the sensors A to S.

The groups of indicators which are created during the successive pulses from the clock circuit 30 are also stored one after another by the creator of sequences of identifiers in RAM memory 26. A sequence or sequence of identifiers which identifies a specific written character is thus created during inscription of such character on crystal 3.

Next, comparator 29 compares this sequence of identifiers with sequences of reference identifier sequences stored in the RAM memory 27. Each of such reference identifier sequences corresponds to a character intended to be written by the user on crystal 3 and which is thereafter processed by a utilization arrangement forming part of the watch 1. This utilization arrangement could, for example, be a calculator or another arrangement which recognizes figures and/or letters. If the sequence of identifiers generated by the writing of a character by the utilizer differs from one of the reference identifier sequences by less than a pre-determined number of identifiers, comparator 29 furnishes a signal representative of the character corresponding to such reference identifier sequence to the utilization arrangement.

Figure 4:
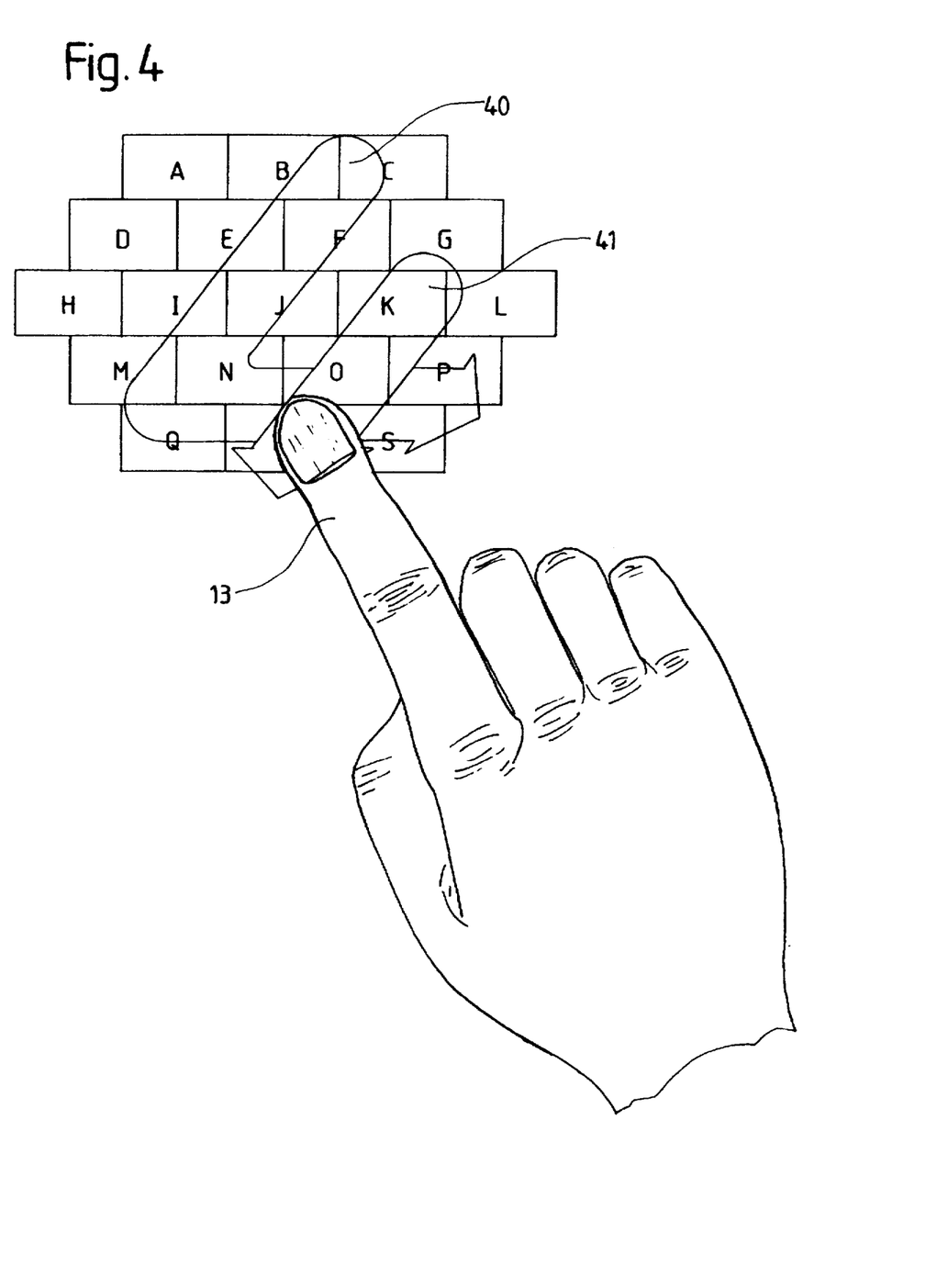
FIG. 4 shows an example of a trajectory followed in inscribing a character onto the crystal of the watch of FIG. 1.

The operation of the identification arrangement 20 is now to be described having reference to FIGS. 4 to 8. FIG. 4 shows the arrangement of sensors A to S of FIG. 3 on which, by way of example, the path of the trajectory of finger 13 by the transcription of digit 4 has been symbolized by arrows 40, 41. In following this trajectory, it is seen that finger 13 is initially positioned facing electrodes B and C of the sensors.

In such conditions, the total capacities present at the input of the voltage controlled oscillators associated with electrodes B and C are modified. The change of frequency of these two voltage controlled oscillators is detected by the frequency detectors associated with such oscillators. Thus, the output signal of each of such frequency detectors is in the high state, while the output signals coming from the other frequency detectors associated with electrodes A and D to S, are all in the low state.

Figure 5:
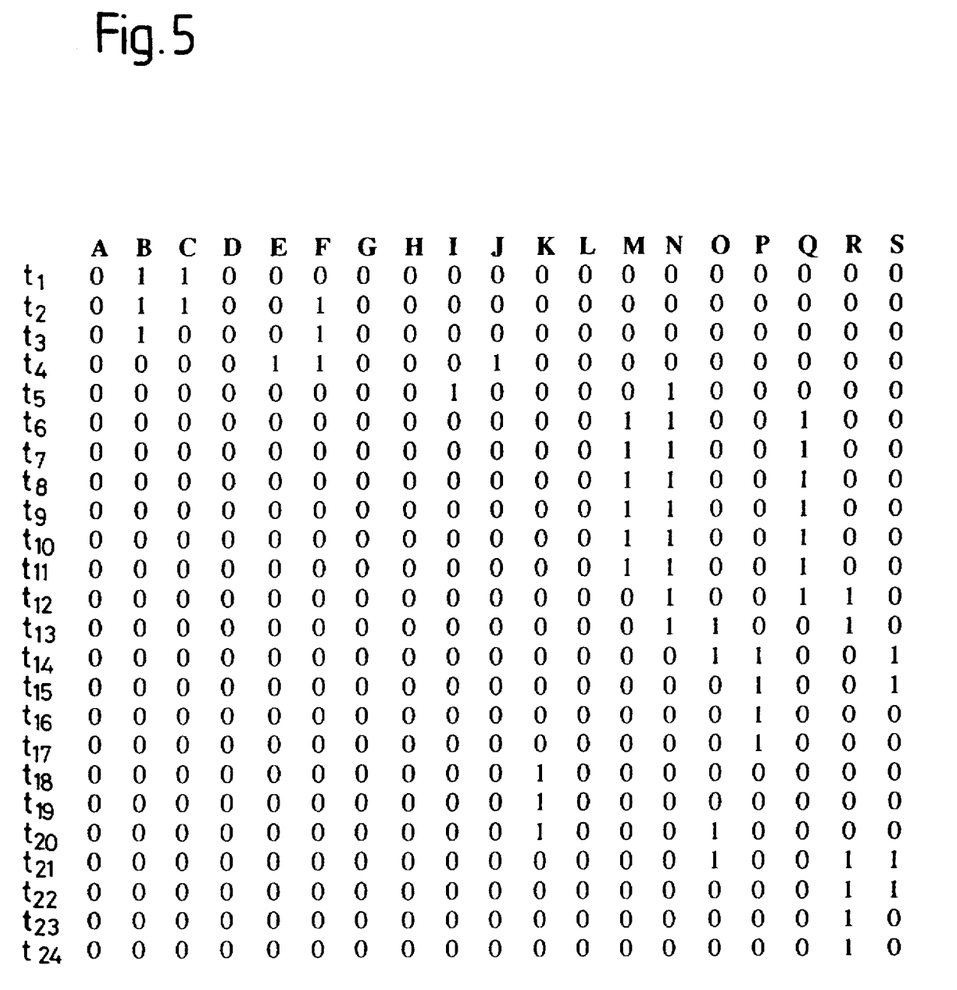
FIG. 5 is a table showing the binary elements forming the binary word coming from the sequence of frequency detectors of the identification arrangement of FIG. 2.

FIG. 5 is a table which shows the state of signals coming from the frequency detectors associated with electrodes A to S at the sampling instants $t_1$ to $t_{24}$ during writing of the digit "4" along the trajectories 40 and 41 of FIG. 4. It is seen on FIG. 5 that the high states are shown by "1" while the low states are shown by "0". There results therefrom that the binary word supplied to the state detector at the instant $t_1$ has the value 0110000000000000000.

Figure 6:
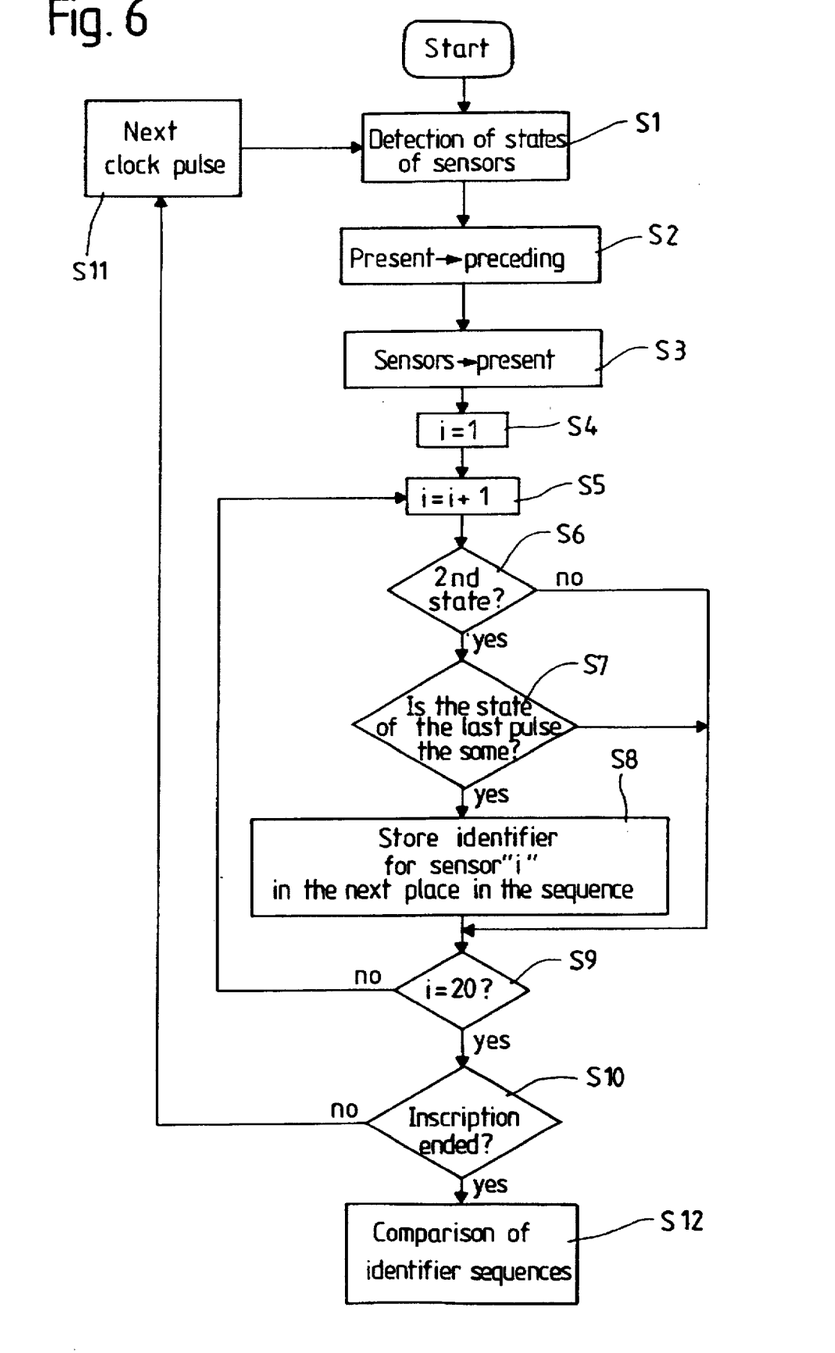
FIG. 6 is a flow chart of a method of identification according to the present invention.

FIG. 6 is a flow chart with the help of which the various stages of operation during the inscription and the identification of the character shown on FIG. 4 of the identification arrangement 20 is now to be explained. Stage S1 corresponds to the stage of detection of the state of the capacitive sensors which have just been described. The RAM memory 26 includes an address at which is stored the binary word supplied by the sequence of frequency detectors 24 at a specific sampling instant. The RAM memory 26 further includes another address at which is stored the binary word supplied by the sequence of frequency detectors 24 at the preceding sampling instant. These two binary words will be respectively called the "present" binary word and the "preceding" binary word. At stage S2, the contents of the address at which the preceding binary word is stored is replaced by the contents of the address at which the present binary word is stored. Before the inscription of the digit which one wishes has begun, both of these binary words have the value 0000000000000000000. Next, at stage S3, the binary word coming from the sequence of frequency detectors 24 at instant $t_1$, that is to say, the word 0110000000000000000, is written into memory 26 at the address of the present binary word.

The change-of-state detector 25 includes a counter which, at stage S4, is set to an initial value i=1. At the next stage S5, the contents of such counter is increased by one unit. The values of "i" comprised between 2 and 20 correspond respectively to the binary unit associated with electrodes A to S shown on FIG. 4.

At stage S6, the change-of-state detector 25 examines the state of the "$i^{th}$" binary unit which forms part of the present binary word. When the value of "i" is 3, for example, it concerns the binary unit corresponding to the electrode B. If the state of such binary unit is low, one proceeds to stage S9 and if the value of "i" is less than 20, such value is increased by one unit at step S5 and the state of the next binary unit in the present binary word is examined.

On the other hand, if the state of the "$i^{th}$" binary unit is high, the change-of-state detector compares, at stage S7, the state of such binary unit in the present binary word with the state of the "$i^{th}$" binary unit in the preceding binary word which is stored in RAM 26. If there exists a difference between the state of such binary units, a signal corresponding to the electrode associated with such binary units is supplied to the creator of sequences of identifiers 28. The creator of sequences of identifiers 28 stores a signal which identifies such electrodes in the RAM memory 26. Next, if the value of "i" is less than 20, the value of "i" is increased by one unit at stage S5 and the state of the next binary unit in the present binary word is analyzed.

Stages S5 to S9 are repeated until the value of "i" reaches 20. Consequently, the state of all the binary units in the present binary word will have been analyzed.

The method described hereinabove is next repeated at each pulse coming from the clock circuit 30 until the inscription of the character by the user on crystal 3 is terminated. At stage S10, there is detected whether this inscription has been terminated in detecting for example that the state of all the binary units of the present binary word remain in the low state during a predetermined number of sampling periods. If the inscription is not terminated, one waits at stage S11 for the following clock pulse to be detected before recommencing stages S1 to S10.

The identification signals created by the creator of sequences of identifiers 28 during this method are stored one after the other in the RAM memory 26 in order to create a series of identifiers corresponding to the character inscribed on crystal 3 of watch 1. Thus, if there is detected at stage S10 that the inscription of the character by the user has been terminated, the creator of sequences of identifiers 28 furnishes the sequence of identifiers which it has just created to comparator 29.

At stage S12, comparator 29 compares the sequence of identifiers furnished by the creator of sequences of identifiers 28 to the sequences of reference identifiers stored in RAM memory 27 in order to identify the character transcribed by the user. In this comparison, the identifiers of the sequence of identifiers furnished by the creator of sequences of identifiers 28 are compared with the identifiers of each sequence of reference identifiers. If such comparison determines that there is agreement between the sequence of identifiers furnished by the creator of sequences of identifiers 28 and one of the series of reference identifiers stored in RAM memory 27, comparator 29 furnishes a signal representative of the identified character to the utilization arrangement of watch 1. It must be observed that an exact correspondence is not required in order to identify the transcribed character. A certain error designated in the art by "distance" is allowed, provided that such error does not exceed a maximum value.

Figure 7:
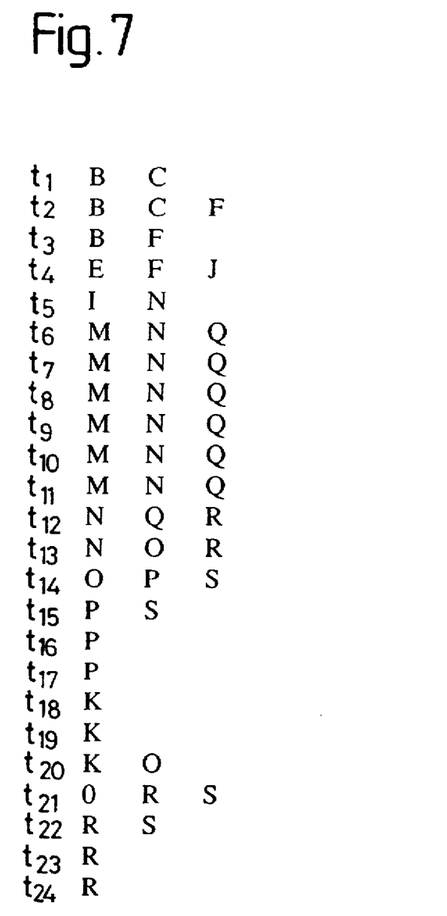
FIG. 7 is a table showing the capacitive sensors forming part of the identification arrangement of FIG. 2 which are activated at the sampling instants during inscription of the character of FIG. 4.

FIG. 7 is a table which shows, in the case of the inscription of the character in FIG. 4, the electrodes A to S for which the corresponding binary units in the present binary word are in the high state at instants $t_1$ to $t_{24}$. It is seen on this figure that the binary unit corresponding to electrodes B and C are in the high state at instant $t_1$, that binary units corresponding to electrodes B, C and F are in the high state at instant $t_2$, and that the binary units corresponding to electrodes B and F are in the high state at instant $t_3$, etc.

As has been described hereinabove, the difference-of-state detector 25 compares, at stage S7, the state of the binary units found in the high state in the present binary word with the state of the binary units in the preceding binary word stored in RAM 26.

At instant $t_1$, for example, the binary units associated with electrodes B and C in the present binary word, are in the high state, while the corresponding binary units in the preceding binary word are in the low state. Thus, a signal corresponding to electrode B and thereafter a signal corresponding to electrode C are furnished to the creator of sequences of identifiers 28.

At instant $t_2$, the binary units associated with electrodes B, C and F in the present binary word are in the high state. At the same time, the binary units corresponding to electrodes B and C in the preceding binary word are in the high state and only the binary unit corresponding to electrode F in the preceding binary word is in the low state. In such case, a signal corresponding to electrode F is furnished to the creator of identification sequences 28 after instant $t_2$.

Figure 8:
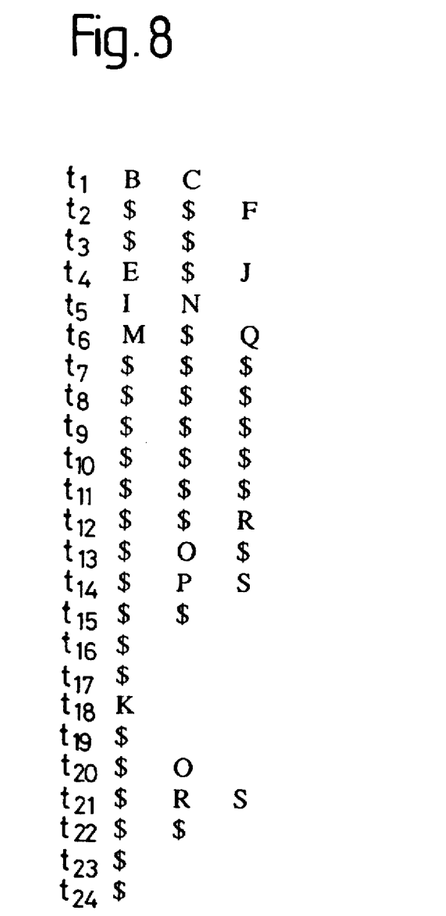
FIG. 8 is a table showing the identifiers produced at the sampling instants during the method of FIG. 6.

FIG. 8 is a table in which the symbols "$" represent the electrodes for which, on the one hand, the corresponding binary unit is in the high state in the present binary word and, on the other hand, the corresponding binary unit in the preceding binary word is also in the high state corresponding to one of the symbols of electrodes A to S in the table of FIG. 7 which have been replaced by the symbols "$". In such conditions, no identification signal is furnished to the creator of sequences of identifiers for these binary units. For example, it is seen on FIG. 7 that only a signal corresponding to electrode E and then a signal corresponding to electrode J are furnished to the creator of sequences of identifiers 28 following instant $t_4$.

Consequently, the series of identification signals received by the creator of sequences of identifiers 28 during the inscription of digit "4" shown on FIG. 4 identifies successively the following electrodes

SYMBOL 4

B C F E J I N M Q R O P S K O R S

Such identifiers are stored one after the other in the RAM memory 26 in order to create a series of identifiers corresponding to the inscribed character. Next, comparator 29 compares such sequence of identifiers with the sequences of reference identifiers with have already been stored in RAM memory 27 in order to identify the written character.

Such sequences of reference identifiers are, preferably, stored in RAM memory 27 in the course of a learning mode. In such a mode, the user can, for example, write on crystal 3 of watch 1 a reference character. The sequence of identifiers generated by the user can be stored in RAM memory 27 as a sequence of reference identifiers. Preferably, several examples of each reference character will be inscribed by the user and the mean of the sequences of identifiers thus produced will be taken before storing the results in RAM memory 27.

Finally, it is to be observed that several modifications can be applied to the identification arrangement and to the method of identification according to the invention without leaving the framework thereof. For example, although capacitive sensors have been provided in the embodiments described herein-above, any other sensor capable of detecting the absence or presence of a writing instrument in discrete zones of a writing surface can be employed.

What I claim is:

1. An arrangement for the identification of a character transcribed onto a surface by a writing instrument, such arrangement comprising:

a plurality of sensors producing respective output signals having respectively either a first or a second state according to the absence or the presence of said writing instrument in a discrete zone of said surface;

means for forming for each output signal, a binary word in which binary elements are representative of the states of the output signal means for detecting periodically the state of said output signals during the transcription of said character;

means for determining which, among said output signals, is in said second state at each detection of states;

means for comparing each of said output signals found in said second state with the output signal which has been produced by the same sensor during the preceding detection of states;

means for storing, according to a predetermined order of said sensors, identifiers corresponding to only those sensors for which a change of states between two consecutive output signals has thus been detected, thereby minimizing the data required to be stored and processed to identify the transcribed character, said stored identifiers thus forming a sequence of identifiers corresponding to said transcribed character; and means for comparing said sequence of stored identifiers with at least one sequence of reference identifiers in order to identify said transcribed character.

2. A watch comprising a crystal and having an arrangement for the identification of a character transcribed by a writing instrument on a surface according to claim 1, said surface being constituted by the outer surface of said crystal.

3. A method of identification of a character transcribed by a writing instrument on a surface, with the help of a plurality of sensors producing respective output signals having respectively either a first state or a second state according to the absence or the presence of said writing instrument in a discrete zone of said surface, said method comprising the steps of:

forming for each output signal a binary word in which binary elements are representative of the states of the output signal;

periodically detecting the states of said output signals during the transcription of said character;

deter at each detection of states which, among the output signals, is in said second state;

comparing each of said output signals found in said second state with the output signal produced by the same sensor at the detection of the preceding state;

storing, according to a predetermined order of said sensors, identifiers corresponding to only those sensors for which a change of states has thus been determined, thereby minimizing the data required to be stored and processed to identify the transcribed character, said stored identifiers thus forming a sequence of identifiers corresponding to said transcribed character; and comparing said sequence of stored identifiers with at least one sequence of reference identifiers in order to identify said transcribed character.

\* \* \* \* \*